United States Patent [19]
Mauz

[11] Patent Number: 5,338,055
[45] Date of Patent: Aug. 16, 1994

[54] INDEPENDENT WHEEL SUSPENSION

[75] Inventor: Uwe Mauz, Esslingen, Fed. Rep. of Germany

[73] Assignee: Mercedes-Benz AG, Stuttgart, Fed. Rep. of Germany

[21] Appl. No.: 817,820

[22] Filed: Jan. 8, 1992

[30] Foreign Application Priority Data

Jan. 8, 1991 [DE] Fed. Rep. of Germany ....... 4100296

[51] Int. Cl.$^5$ ............................................. B60G 11/00
[52] U.S. Cl. ................................... 280/668; 267/280; 267/282; 280/96.1; 280/673; 280/692; 280/716
[58] Field of Search ............... 280/667, 668, 670, 673, 280/696, 692, 716, 96.1; 267/220, 33, 280, 282, 294, 153, 140.2

[56] References Cited

U.S. PATENT DOCUMENTS

| | | |
|---|---|---|
| 4,756,517 | 6/1988 | Kakimoto . |
| 4,871,187 | 10/1989 | Schaible ........................ 280/667 |
| 5,005,855 | 4/1991 | Lee ............................... 280/662 |

FOREIGN PATENT DOCUMENTS

| | | |
|---|---|---|
| 0174007 | 3/1986 | European Pat. Off. . |
| 0204913 | 12/1986 | European Pat. Off. . |
| 2507071 | 2/1978 | Fed. Rep. of Germany . |
| 8609696 | 7/1986 | Fed. Rep. of Germany . |
| 3843820 | 5/1990 | Fed. Rep. of Germany . |
| 3938773 | 6/1990 | Fed. Rep. of Germany . |
| 1241657 | 8/1960 | France . |
| 1374458 | 8/1964 | France . |
| 2277690 | 2/1976 | France . |
| 2364777 | 4/1978 | France . |
| 2444578 | 7/1980 | France . |
| 0063143 | 5/1981 | Japan .......................... 280/668 |
| 0186410 | 5/1981 | Japan .......................... 280/668 |
| 1005633 | 9/1965 | United Kingdom . |

OTHER PUBLICATIONS

J. Reimpell, "Fahrwerktichmik 1"; Fourth Edition, p. 380.

*Primary Examiner*—Eric Culbreth
*Attorney, Agent, or Firm*—Evenson, McKeown, Edwards & Lenahan

[57] ABSTRACT

A wheel suspension for a motor vehicle in which one of the wheel suspension links forms a wheel suspension strut and has a shock absorber which is elastically supported by means of its piston rod in an upper guiding joint which is fixed to the body. The upper guiding joint is prestressed to generate a countermoment counteracting bending moments in a transverse plane of the vehicle about the hinge point.

20 Claims, 8 Drawing Sheets

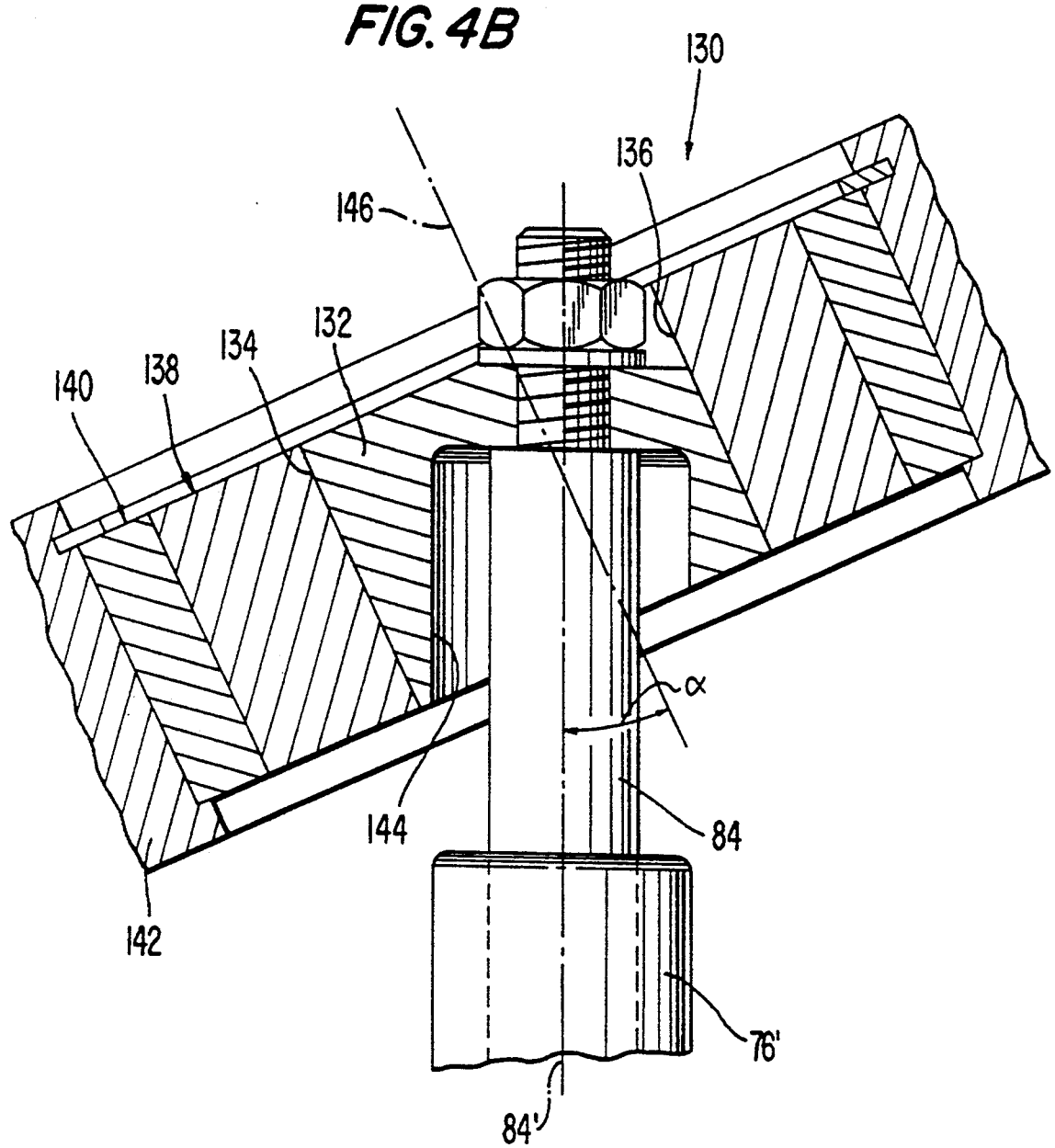

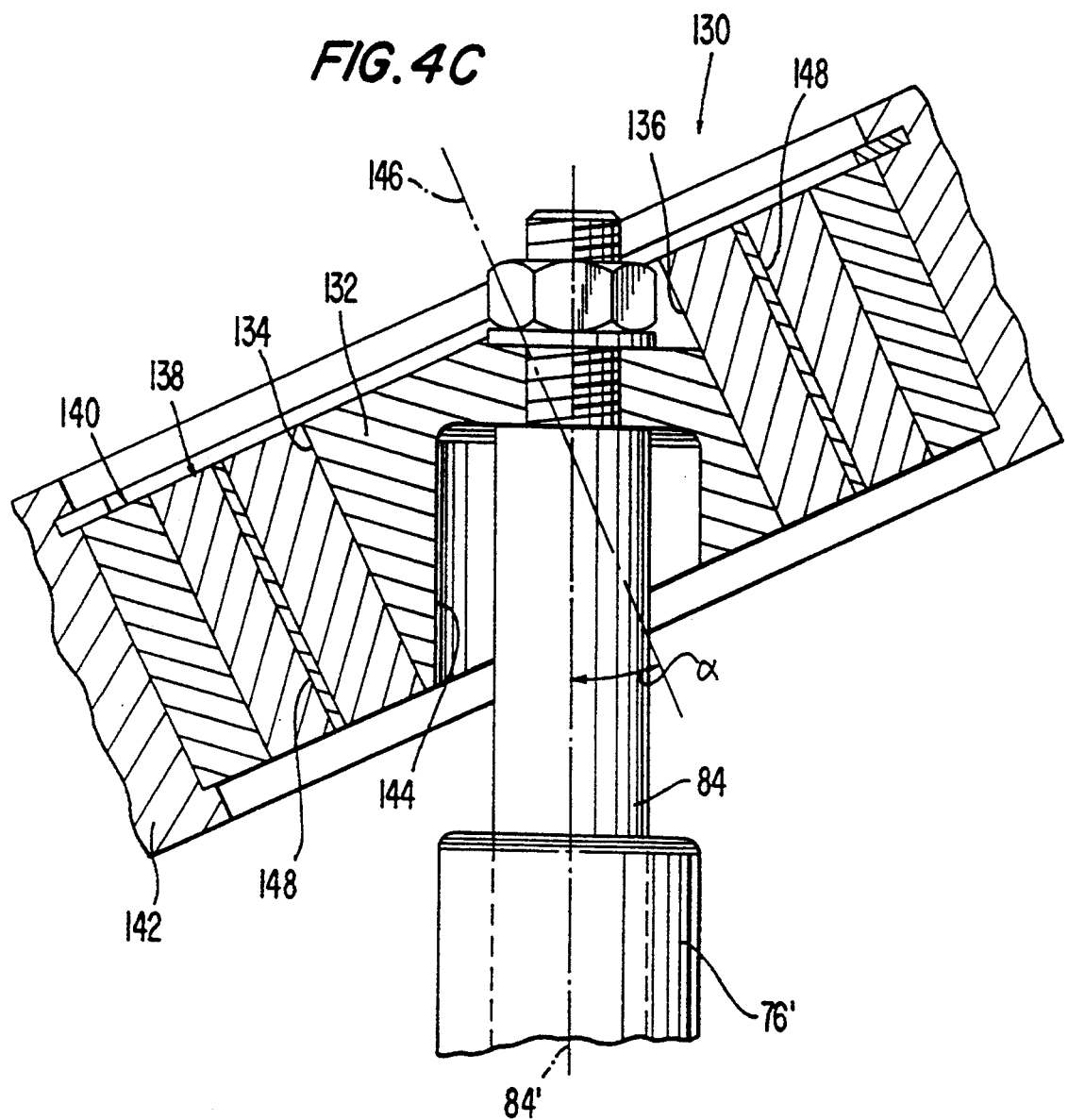

INDEPENDENT WHEEL SUSPENSION

BACKGROUND AND SUMMARY OF THE INVENTION

This invention relates to an independent wheel suspension of motor vehicles.

In wheel suspensions of this type (compare I. Reimpell, "Fahrwerktechnik 1"; 4th Edition, Page 380) overturning moments occur as a result of the wheel contact force and the lateral distance between the supporting joint (on the wheel carrier) of the lower suspension link forming the one transverse link and the longitudinal center plane of the wheel. Such tilting moments must be absorbed by the upright shock absorber of the upper suspension link, which is elastically supported by its piston rod in the upper suspension joint fixed to the vehicle body. The shock absorber in turn is stressed by a bending moment in the transverse direction of the vehicle, and is thus deformed toward the vehicle's interior. Therefore, as a result of high breakaway forces particularly between the piston rod and the upper piston rod guide of the shock absorber cylinder, high frictional forces cause a sluggishness of the shock absorber and a substantial wear of the upper piston rod guide.

It is therefore an object of the invention, to provide a wheel suspension of the type referred to above, with significantly improved displaceability of the piston rod in the shock absorber cylinder which is impaired by overturning moments of the wheel carrier.

This object is achieved according to the invention, in which the torque generated by the prestressed upper shock absorber guiding joint seeks to rotate the shock absorber cylinder, essentially by way of the piston carried by the piston rod, in the transverse direction of the vehicle toward the exterior of the vehicle. Thus, with respect to the bending moment exerted on the shock absorber by the wheel carrier, a countermoment tends to qualify its deformation. This leads to a radial stress removal from the upper piston rod guide in the shock absorber cylinder, so that the upper suspension link, particularly in the design position of the wheel suspension, operates smoothly and has a longer service life.

In one embodiment of the invention, bracing of the upper guiding joint is advantageously achieved by a spring formed by the rubber body, which ensures a reliable wheel suspension. The rubber body may be vulcanized in between an inner and an outer bearing part, which is advantageous for desired bearing elasticities because overstraining of the rubber caused by shearing forces can be avoided.

For an upper guiding joint with more than one rubber body, in a preferred embodiment of the invention, two preferably ring-shaped rubber bodies, which can be braced with respect to one another in the axial direction of the piston rod and have a wedge shape in the lateral view, are each supported on mutually opposite sides of a piston rod flange, coaxially to the piston rod, and are assigned to one another such that the circumferential section of the rubber body which has the largest axial thickness is disposed opposite the circumferential section of the other rubber body, which has the smaller axial thickness.

In order to achieve a desirable coordination of their elasticities, the rubber bodies, particularly on their front face facing the piston rod flange, may, if necessary, also be provided with a surrounding groove-type indentation, the depth of which changes along the circumference.

In another preferred embodiment, the upper guiding joint is a ball joint, which ensures exact wheel suspension in that the rubber body, may be designed to be quite stiff for the support of lateral and longitudinal forces, in the radial direction, but at the same time very soft with respect to rotation. Such an arrangement permits corresponding wobbling movements of the inner bearing part, particularly in the case of a steered wheel.

When such a guiding joint is used in a wheel suspension for heavy commercial vehicles, such as buses, it is also advantageous to design the rubber body as a rubber metal element. In this manner, in addition to an overstraining of the rubber caused by shearing forces, the required high radial bearing stiffness can be ensured at the same time for the support of correspondingly high transverse and longitudinal forces.

A further embodiment of the rubber body makes it possible to minimize the installation height of the guiding joint, and to optimize its torsional softness. The ball joint may also be designed so that it minimizes the distance in the design position between the center of the ball joint and the upper piston rod guide of the shock absorber cylinder pipe. As a result, because of the given bearing prestress, a correspondingly minimal bending moment is exerted on the piston rod which, in turn, permits a reduction of the rod diameter.

The ball joint can also be designed so that the upper guide bearing is easily mounted on the shock absorber, and tensile and pressure forces as well as of torque are advantageously supported by way of the inner bearing part on the piston rod.

A final embodiment of the invention makes possible a further reduction in deformations of the shock absorber cylinder pipe resulting from bending moments.

The invention is equally advantageously suitable for wheel suspensions of steering or non-steering vehicle axles, in which case, these may be powered or not powered.

Other objects, advantages and novel features of the present invention will become apparent from the following detailed description of the invention when considered in conjunction with the accompanying drawings.

BRIEF DESCRIPTION OF THE DRAWINGS

FIG. 4B is a sectional view along Line IV—IV of FIG. 2 of a construction variant of a guiding joint;

FIG. 4c is a sectional view along Line IV-IV of FIG. 2 of another variant of a guiding joint;

DETAILED DESCRIPTION OF THE DRAWINGS

Figure 1:
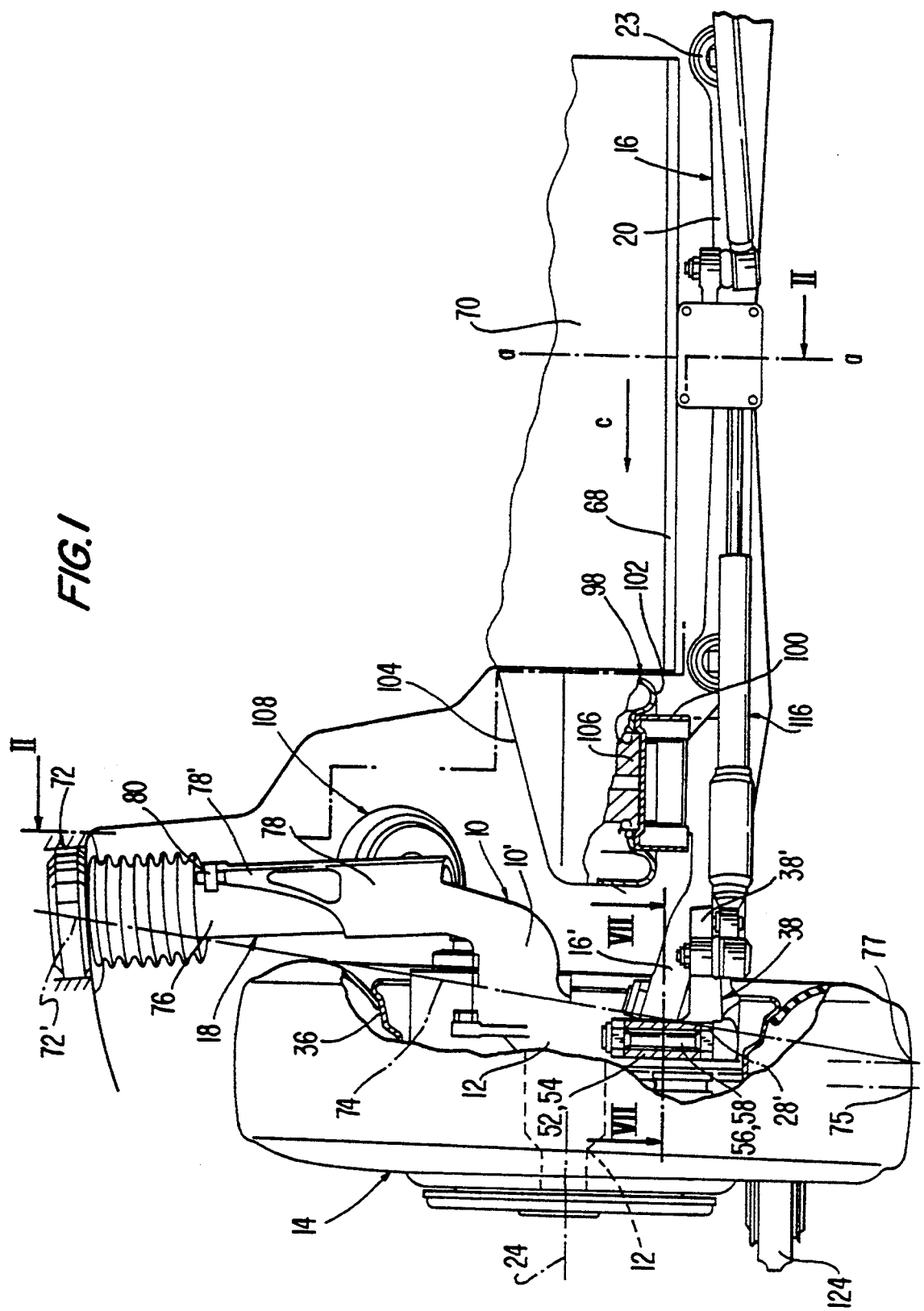
FIG. 1 is a frontal view of a steering axle for a low-floor bus equipped with independent wheel suspensions.
Figure 2:
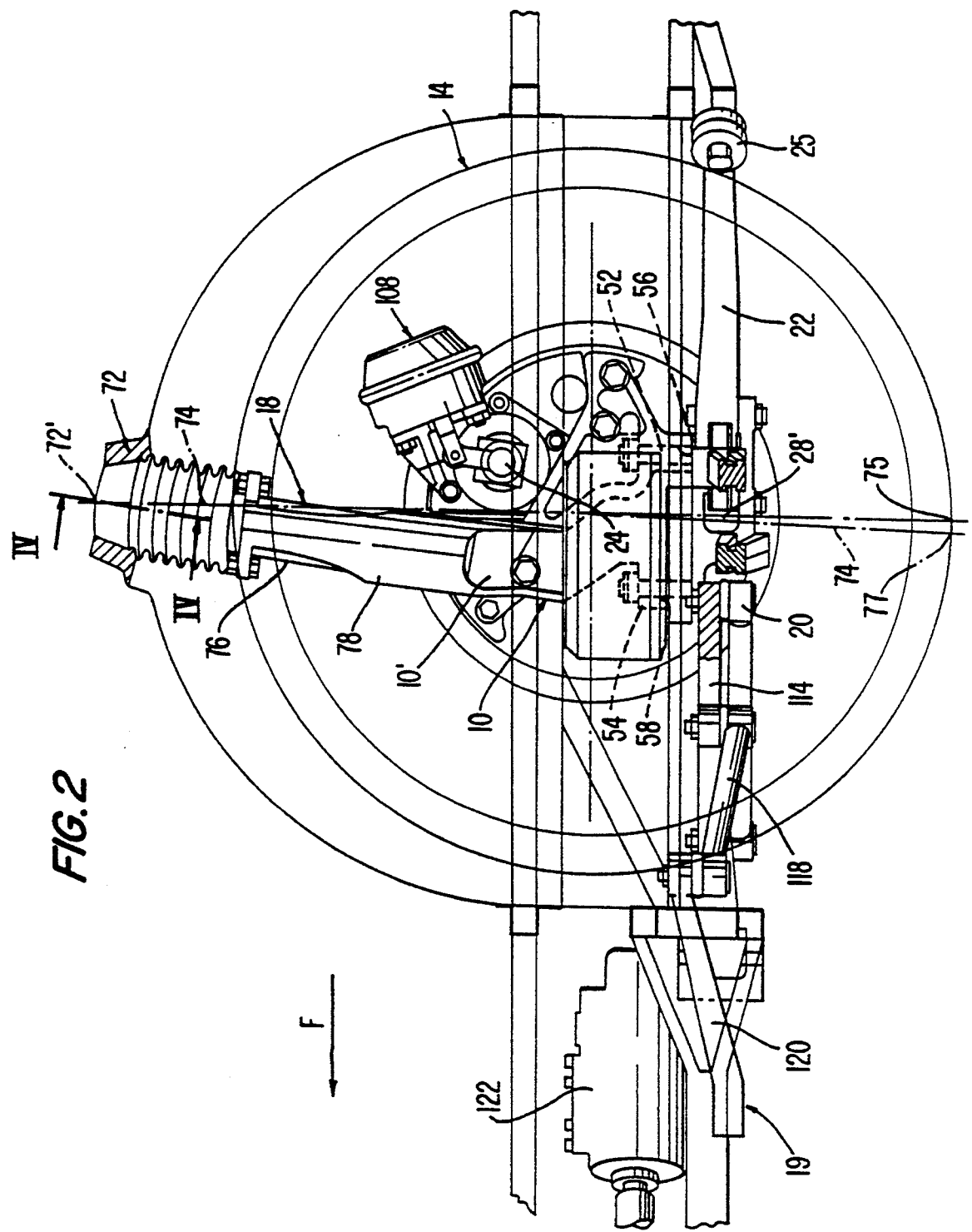
FIG. 2 is a sectional view of the steering axle along Line II—II of FIG. 1.
Figure 3:
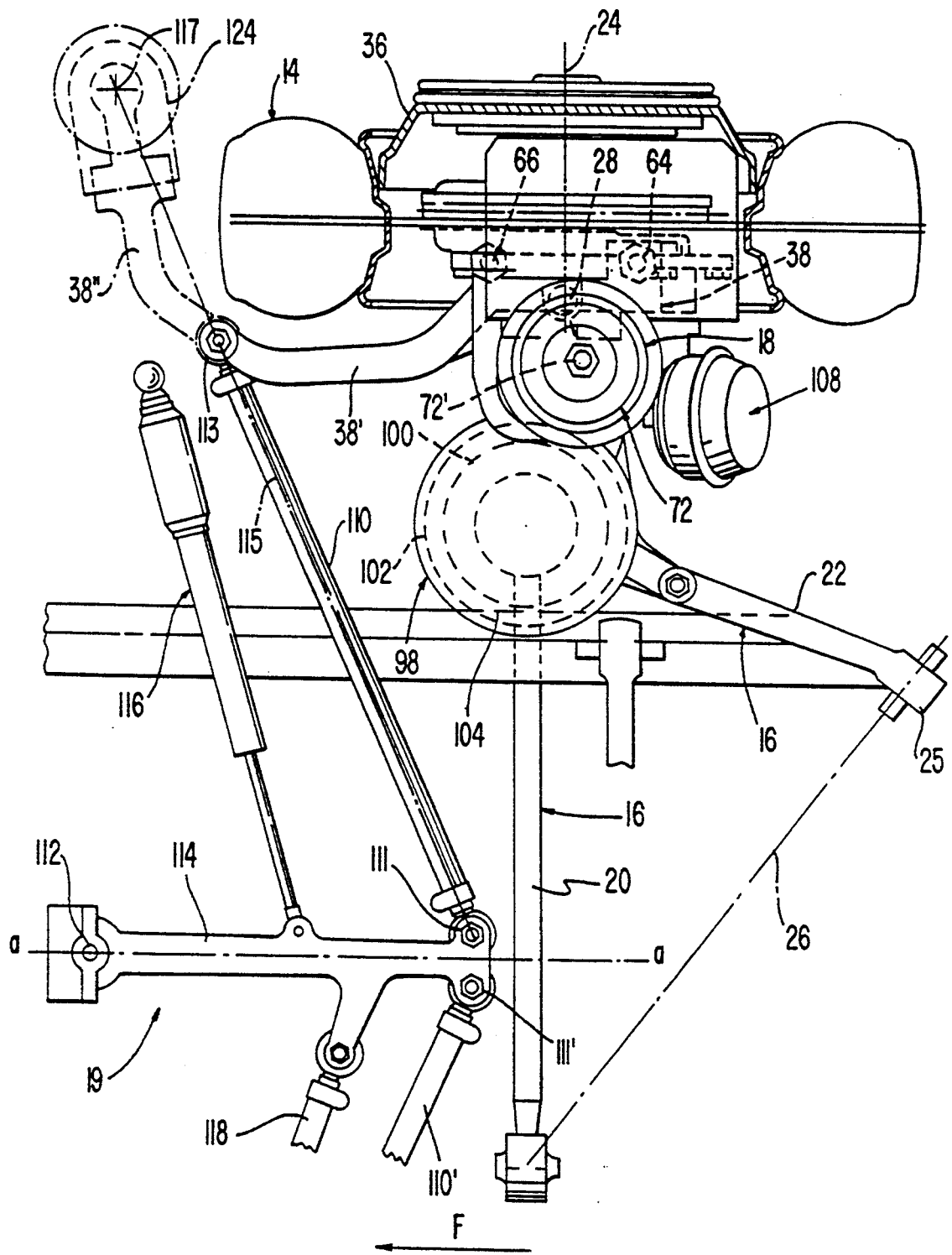
FIG. 3 is a top view of the representation according to FIG. 2.

The steering axle illustrated in FIG. 1 comprises two independent wheel suspensions which correspond to one another (only one of which is shown). This wheel suspension comprises a wheel carrier 10 a journal 12 on which a wheel 14 is rotatably disposed. The wheel carrier 10 is guided by means of a lower semi-trailing arm 16, an upper suspension link constructed, for example, as a shock absorber strut 18, and a steering device 19 (FIGS. 2, 3).

The semi-trailing arm 16 is comprised of a control arm 20 (which preferably extends beyond the longitudinal center plane a—a of the vehicle forming a transverse link) and by a control arm 22, which is rigidly connected with control arm 20 and forms a longitudinal link. When viewed in the top view and relative to the driving direction F, control arm 22 is situated behind the wheel spin axis 24 and extends diagonally toward the front and outside and, in the design condition, essentially horizontally. (See FIG. 3.) The control arm 20, starting from its connecting point at control arm 22, is situated forward of the wheel spin axis 24, relative to the driving direction F. Accordingly, the corresponding control arm for the opposite wheel suspension is provided behind the wheel spin axis 24.

The bearings 23 and 25 of the two control arms 20 and 22 which are fixed to the vehicle body, because of a correspondingly selected control arm length and a corresponding control arm fitting, define a semi-trailing arm swivelling axis 26 which, viewed in the top view (FIG. 3) and relative to the driving direction F, is situated behind the wheel spin axis 24 and extends diagonally from the inside toward the rear outside. Swivel axis 26 takes up a diagonal position of between 35° and 60°, preferably 50°, with respect to the longitudinal center plane a—a of the vehicle.

In this manner, a correspondingly wide supporting base is created for the semi-trailing arm 16 on the vehicle body side so that as a result of the design length of the two control arms 20 and 22 and of the fitting of the semi-trailing arm 16 into the steering axle, axle kinematics are achieved which, among others, minimize camber changes due to compressions and rebounds.

Figure 6:
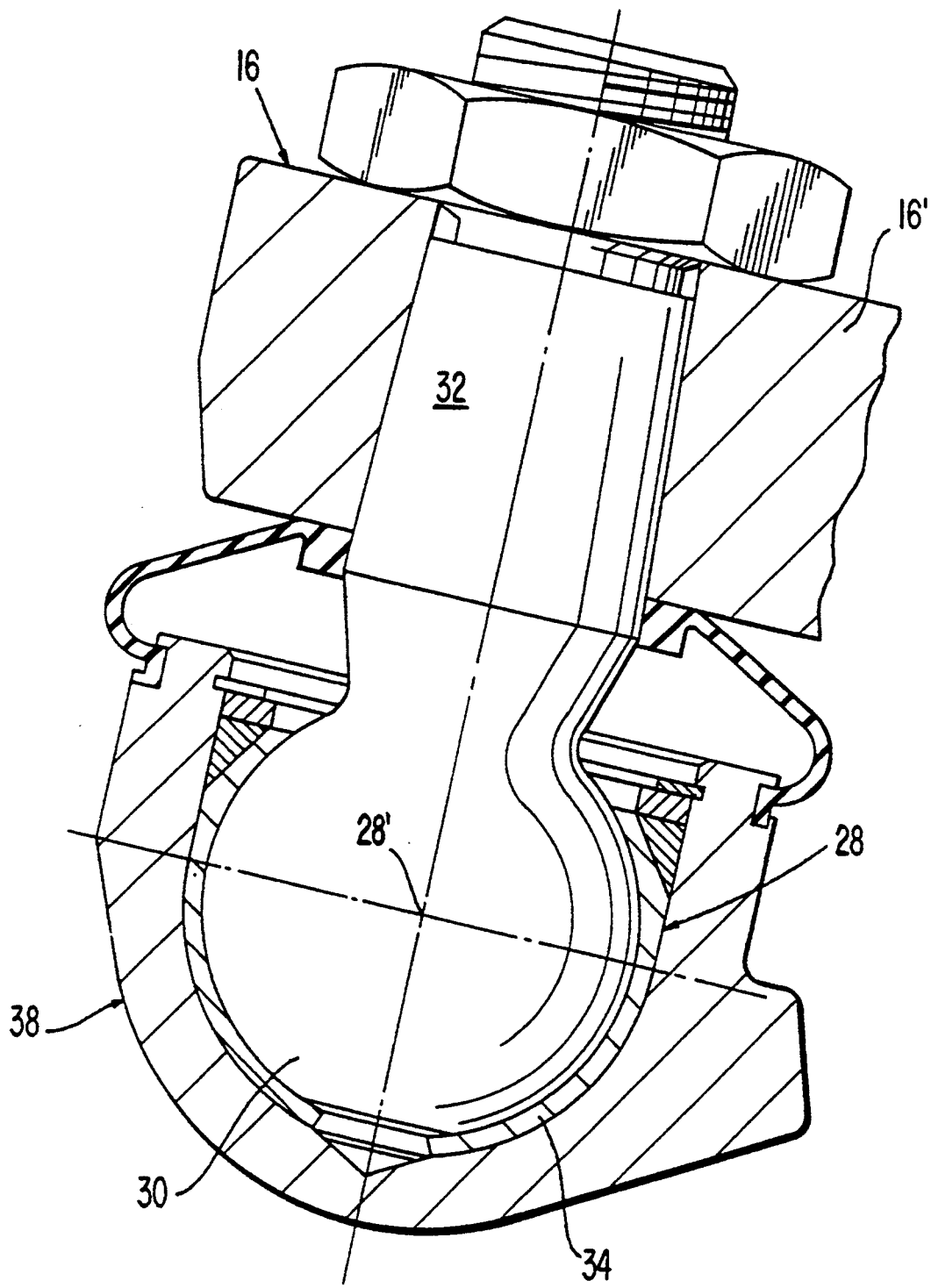
FIG. 6 is a sectional view along Line VI—VI of FIG. 5.

The pivotal connection of the semi-trailing arm 16 on the wheel carrier 10 is achieved by means of a suspended supporting joint 28 (FIG. 6) which forms a ball joint. Its spherical part 30 is disposed on a preferably conical journal 32 which, in turn, is held in the wheel-carrier-side end piece 16' of the semi-trailing arm 16 with the spherical part 30 on the bottom side thereof.

A ball socket 34, which receives the spherical part 30, is provided, preferably by molding, in an end piece of a supporting member 38 fastened to the bottom side of the wheel carrier 10 inside the wheel rim 36. The ball socket 34 is situated between two upper steering arm frontal areas 40 and 42 provided in the same plane. When the supporting joint 28 is mounted, its journal 32 is directed at an acute angle upwards and inwards relative to the plane of steering arm frontal areas 40, 42, in the transverse direction of the vehicle. (See FIG. 6.)

The frontal areas 40 and 42 each form an upper front face of a fastening lug 44 and 46 molded to the supporting member 38 which, in each case, is penetrated by a longitudinal bore 48 and 50.

In an alignment with these bores 48 and 50, lower fastening lugs 52 and 54 of the wheel carrier 10 are also each penetrated by a bore 56 and 58. These fastening lugs 52 and 54 bound an indentation 59 of the wheel carrier 10 which opens upward toward the inside (in the transverse direction of the vehicle) and which partially receives the end piece 16' of the semi-trailing arm 16 which is disposed on the journal 32 of the supporting joint 28. (See FIG. 6.)

Figure 5:
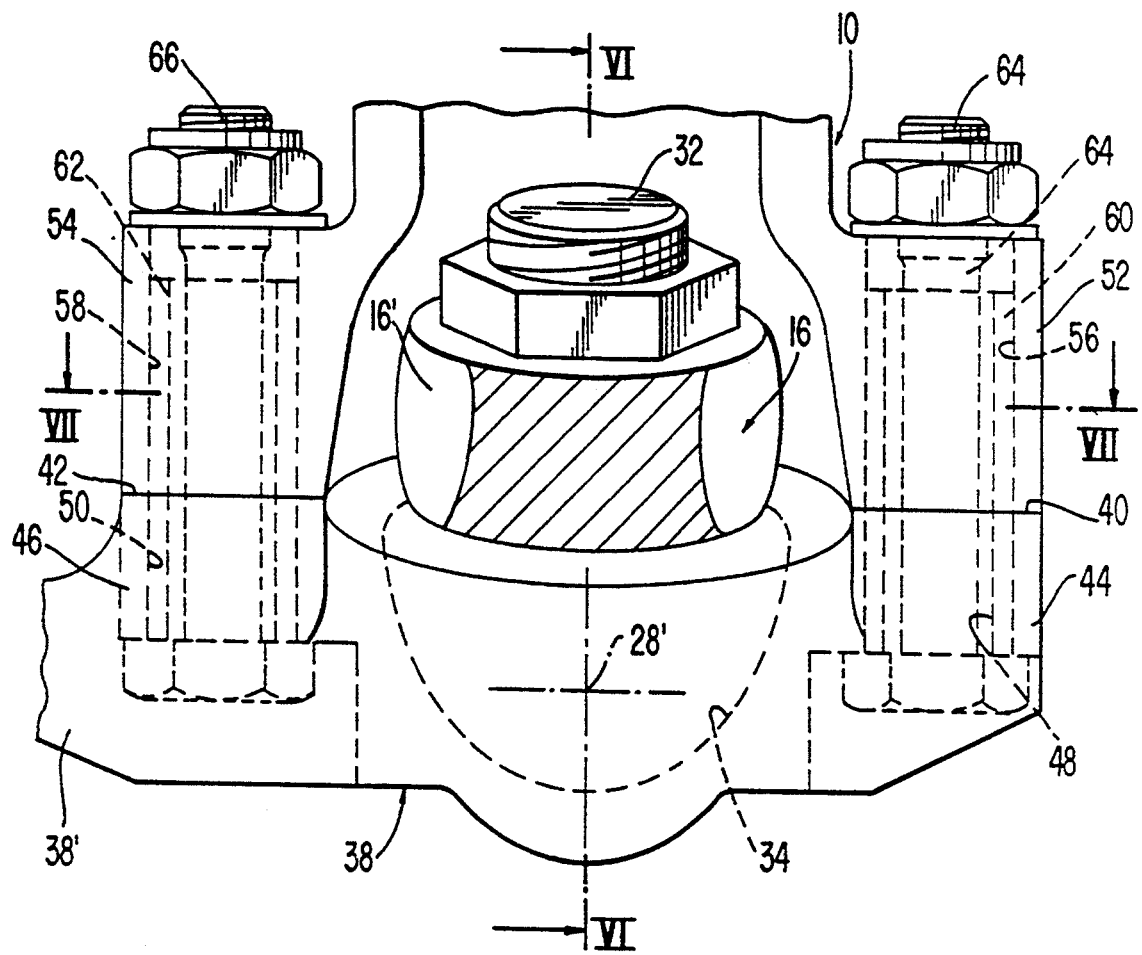
FIG. 5 is a view of the lower part of the wheel carrier, in the direction of the arrow C of FIG. 1.
Figure 7:
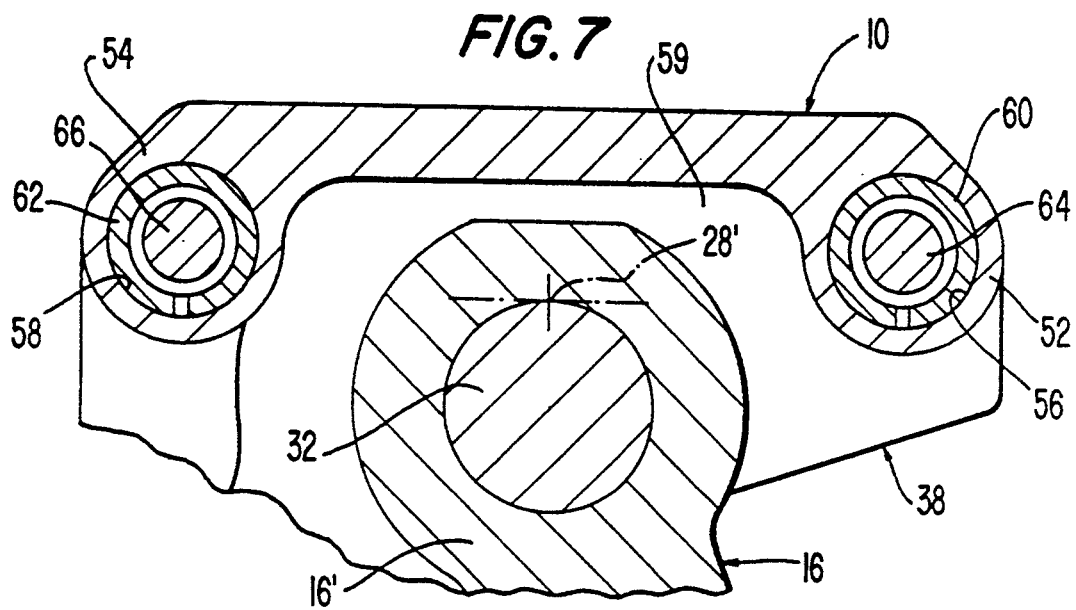
FIG. 7 is a sectional view along Line VII—VII of FIG. 5.

By means of shear bushings 60 and 62 respectively inserted into the bores 48, 50, 56, 58 and the screws 64 and 66 (see FIG. 5), the supporting member 38 is securely fixed to the wheel carrier 10.

A connecting part 38', which projects toward the inside in the transverse direction of the vehicle, extends from the supporting member 38 in the driving direction F. Together, both parts 38 and 38' form a steering arm.

As shown in FIG. 1, pivot point 28' of the supporting joint 28 is situated approximately in the horizontal plane of the control arm 20 of the semi-trailing arm 16, which has the larger length and is directed in the transverse direction of the vehicle. This is achieved by a corresponding offset of the semi-trailing arm end piece 16' diagonally upwards. As a result, it is possible to place the height of a floor 68 (such as a gangway of a bus body extending in the longitudinal center plane a—a) very low above the axles.

As indicated by FIGS. 1 and 2, the shock absorber strut 18 is fitted into the independent wheel suspension preferably in such a manner that it extends, from its upper elastic guiding joint 72, which is fixed to the vehicle body, in the transverse direction of the vehicle, diagonally downward toward the inside and, relative to the driving direction F, downward toward the front.

The pivot point 28' of the supporting joint 28 and the pivot point 72' of the guiding joint 72 of the shock absorber strut 18 define a steering axis 74, which, due to its inclination, results in both a positive kingpin offset, and a track point 77 which is situated in front (relative to the driving direction F) of the wheel contact point 75 (FIG. 2), and thus in a positive caster.

The lower end piece of the cylindrical pipe 76 of the shock absorber strut 18 ends at a substantial distance above the semi-trailing arm end piece 16' (see FIG. 1) and, for this purpose, is held in an upwardly directed neck 78 which is held by a wheel carrier projection 10' extending above the control arm end piece 16' in the transverse direction of the vehicle.

Even in the event of spring movements of the wheel 14, the semi-trailing arm arrangement ensures an extensive constancy of the inclination. Moreover, the bending stress of the cylindrical pipe 76 of the shock absorber strut from bending moments resulting from lateral and longitudinal forces is reduced by the fact that a supporting element in the form of a neck extension 78' is provided which partially reaches around the cylindrical pipe 76 along a portion of its length.

In order to provide a sufficient clearance for the wheel 14 during compression, the neck extension 78' is preferably supported on the circumferential pipe part facing the longitudinal center plane a—a of the vehicle. To generate the required reaction force, on this supporting side, a screwed connection 80 with the pipe jacket is provided on the free end of the neck extension 78'.

The upper guiding joint 72 is constructed so as to afford a considerable decrease of friction in the piston rod guide of the shock absorber strut 18. As illustrated in FIG. 4, it is, for this purpose, constructed as a ball joint which can be prestressed in the transverse direction of the vehicle, and is shown in the relaxed state.

Reference number 82 indicates an inner bearing part in the form of a spherical joint part fastened to the upper end of a piston rod 84. The inner bearing part 82 is vulcanized into a rubber body 86, (preferably in the form of a rubber metal element) which, in turn, is vulcanized into an outer bearing part forming the bearing housing 88. The bearing housing 88, in turn, is inserted into a support 90 which can be fastened to a receiving base of the vehicle body. (For the sake of simplicity, the receiving base is not shown in FIGS. 1 and 4A)

Figure 4A:
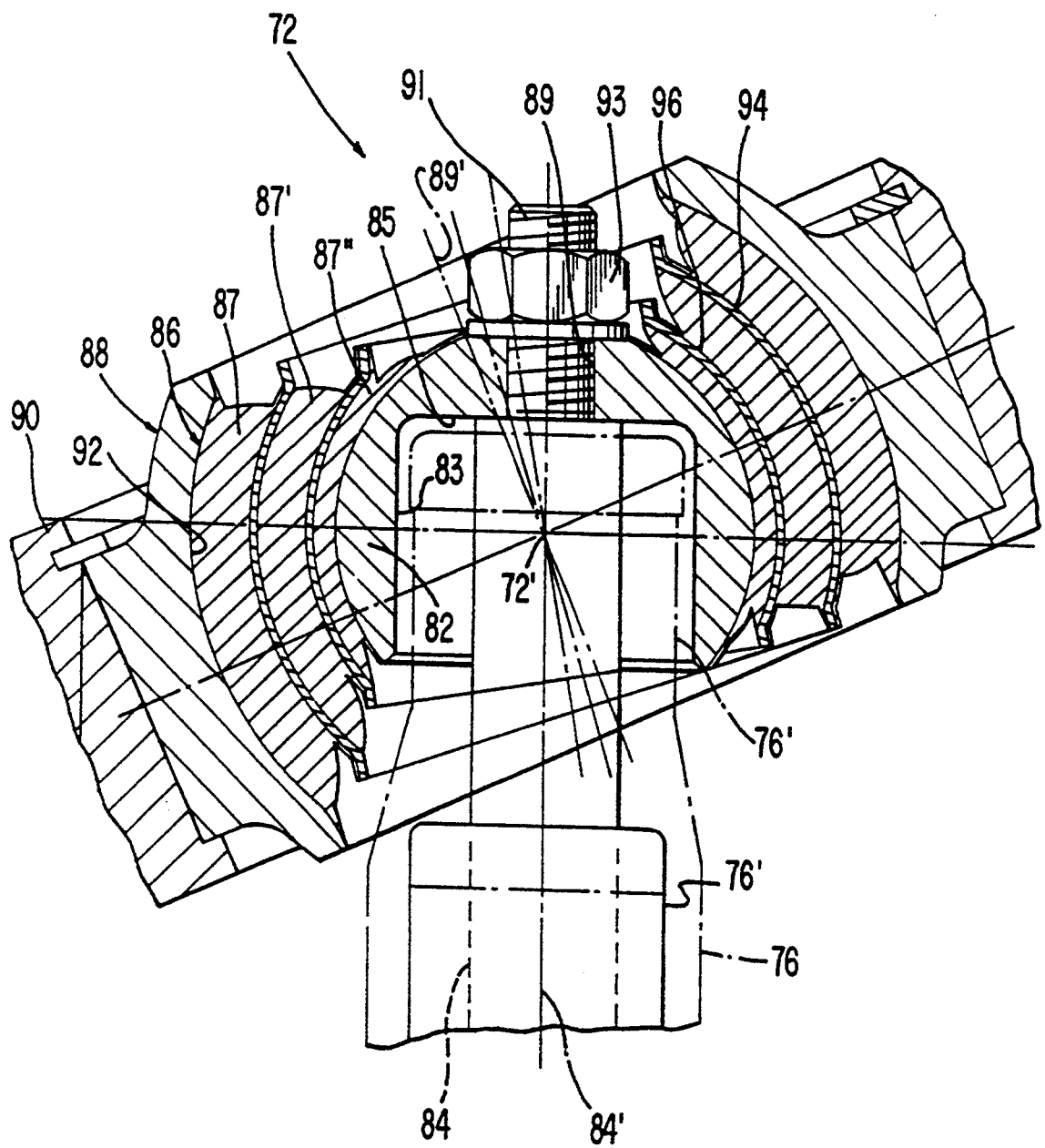
FIG. 4A is a sectional view along Line IV—IV of FIG. 2 of the guiding joint of the shock absorber strut of the steering axle, with the guiding joint is shown in a relaxed condition.

As shown in FIG. 4A, the spherical part 82 has a blind-bore hole 83 which is penetrated at its bottom 85 by a central bore 89, which in turn is penetrated by a threaded shaft 91 molded onto the free front face of the piston rod 84.

The top end of the piston rod 84 is supported on the bottom 85 of the blind-hole bore 83 where it is secured a threaded nut 93 screwed onto the threaded shaft 91.

The diameter of the blind bore hole 83 is selected to be slightly larger than the outside diameter of the upper end piece 76' of the cylinder pipe 76.

The engaging of the piston rod 84 into the blind-bore hole 83 has the advantage that it facilitates a relatively small distance between the pivot point 72' and the upper end piece 76' of the cylinder pipe 76 in all suspension conditions of the wheel suspension. In the case of a maximal compression, this end piece 76' can penetrate the spherical joint part 82, which offers advantages with respect to the overall height of the wheel suspension. The arrangement of the spherical joint part 82 on the piston rod 84 is easy to achieve, and the mutual bracing of these parts 82 and 84 ensures a secure shock absorber force transmission into the ball joint 72 as well as the same type of support of tensile and pressure forces and of the torque.

The bearing housing 88 is constructed in the manner of a hollow sphere which is truncated on mutually opposite sides. It is therefore open on both sides, and its center coincides with that of the spherical joint part 82, and the rubber metal element 86 is vulcanized onto its inner circumferential surface 92.

The rubber metal element 86 comprises several partially spherical rubber body sections. For example, three such sections 87, 87', 87" are shown in FIG. 4A. In order to achieve certain desired spring characteristics and to generate the required bearing prestressing forces, intermediate metal sheets 94 and 96 are vulcanized to the respective body sections, and are constructed in the manner of hollow spheres which are truncated on mutually opposite circumferential areas, in the same manner as the rubber sections 87, 87' and 87".

In the design position of the guiding joint 72 illustrated in FIG. 4, the axis 84' of the piston rod 84 extending through the hinge point 72' differs from that of the axis 89' of the bearing housing 88, penetrating pivot point 72'.

During installation of the guiding joint 72, the bearing housing 88 and the piston rod 84 in the plane of the drawing of FIG. 4 are swivelled relative to one another such that both axes 84' and 89' preferably substantially coincide. The rubber metal element 86 is therefore prestressed in such a manner that, in the installed position of the guiding joint 72, relative to the construction position of the vehicle body, the piston rod 84 can easily break off in the upper piston rod guide of the shock absorber strut cylinder pipe 76 or is guided by means of an optimally minimized friction. For this purpose, the prestressed rubber metal element 86 seeks to swivel the piston rod 84, according to FIG. 1, clockwise and thus the shock absorber strut cylinder pipe 76 in the transverse direction of the vehicle toward the outside.

Positioning the lower support of the shock absorber strut 18 at a point far above the offset semi-trailing arm end piece 16' offers the advantage of being able to provide an air spring 98 inside the independent wheel suspension in the area close to the wheel. Supporting piston 100 of the air spring is supported on the semi-trailing arm 16 and its air bellows 102 is fixed to the vehicle body by means of a cover plate on a console 104.

This air spring arrangement, which makes it possible to design the gangway 70 of the bus body correspondingly wide, permits a favorable transmission ratio for the air spring 98. It also facilitates a dimensioning of its air bellows 102 which makes it possible to do without a helper spring in the form of a steel coil spring or, for example, a glass fiber reinforced plastic spring as a transverse leaf spring.

A buffer integrated into the air bellows 102, for a progressive course of the characteristic curves according to a predetermined compression path, has the reference number 106.

A compressed-air controlled actuating device, which is known per se, for a disk or drum brake, which is not shown in detail, has the reference number 108.

As indicated in FIG. 3, the steering arm 38, 38', extends in front of the wheel spin axis 24 (relative to the driving direction F), out of the wheel rim 36 and essentially horizontally in the driving direction F. At its free end, a tie rod section 110 of, for example, a two-part tie rod is pivotally connected with its one end. The other end of the tie rod section is pivotally connected to an intermediate steering arm 114 which can be pivoted about a vertical axis 112 in the longitudinal center plane a—a of the vehicle. Another tie rod section 110' also extends from the intermediate steering arm 114 in the direction of the other independent wheel suspension.

The inner joint 111 and 111' of both tie rod sections 110, 110' on the intermediate steering arm 114 is situated at a much smaller distance from the transverse plane of the vehicle containing the wheel spin axis 24 than the steering-arm-side joint 113.

A steering shock absorber 116 is pivotally connected to the intermediate steering arm 114; while a steering rod 118 can be adjusted by means of a pitman arm 120 (FIG. 2) of a steering gear 122.

The direction in which the steering arm 38, 38' extends has the advantage that it can also be used, as illustrated, for a track-guidable steering of the steering axle of the low-floor bus or of another commercial vehicle. For this purpose, the steering arm 38, 38' must be correspondingly lengthened.

The steering arm 38, 38' will then extend toward the outside, while an arm section 38" reaches over the wheel 14 on the front side, and will then carry a track guiding roll 124 which rolls along a track guiding path on a cross-guiding web, (not shown) during driving, and, in the process, transmits the wheel-guiding lateral guiding forces to the steering arm 38, 38', 38".

The tie rod sections 110, 110, cooperate with the intermediate steering arm 114, to bridge the distance between the steering arms 38, 38', 38" of both independent wheel suspensions and form steering arm supporting struts which favorably transmit the lateral guiding forces (particularly in the case of a straight-ahead driving position of the wheels 14) and permit a favorable slim design of the steering arm cross-sections.

For this purpose, the arrangement of the joints 111 and 113 of the tie rod section 110 and the corresponding joints of the other tie rod section 110' (of which only the inner joint 111' is shown) is selected such that the longitudinal axis 115 of the tie rod sections 110, 110', in the straight-ahead driving position of the wheels 14, points to the rotating axis 117 of the track guiding roll 124 disposed on the respective steering arm 38, 38'. The outer joint 113 is disposed on the steering arm 38, 38', 38" at its outer end and adjacent to the track guiding roll 124. Thus, in this wheel position, the tie rod, comprised of tie rod sections 110, 110', forms a bridge between the steering arms with respect to guiding forces transmitted by the track guiding rolls 124 to the steering arms 38, 38', 38" and releases the steering arms.

Finally, the arrangement of the semi-trailing arm 16 and the tie rod sections 110, 110' supported in the center of the vehicle ensure minimal toe-in changes.

FIG. 4B illustrates another embodiment of a guiding joint which, as a whole, has the reference number 130. The inner bearing part 132, has a cylindrical circumferential surface 134 and is vulcanized into a central recess 136 of a preferably circular-ring-shaped rubber body 138 which, in turn, is vulcanized into a bearing housing 140. The latter is disposed in a bearing support 142.

A blind-bore hole entered into the bearing part 132 on its front side facing the shock absorber 76, 84 has the reference number 144, the axis of the blind-bore hole coinciding with the axis 84' of the piston rod 84.

To achieve the required prestressing of the guiding joint 130, the blind-bore hole 144 is disposed at an angle α with respect to the bearing axis 146. The fatening of the piston rod 84 is analogous to the construction according to FIG. 4.

As indicate in FIG. 4C, the rubber body 138 may be constructed as a rubber metal element by the vulcanizing of at least one rubber metal element 148.

Although the invention has been described and illustrated in detail, it is to be clearly nderstood that the same is by way of illustration and example, and is not to be taken by way of limitation. The spirit and scope of the present invention are to be limited only by the terms of the appended claims.

I claim:

1. Independent wheel suspension apparatus for a motor vehicle, comprising:
    a wheel carrier having a wheel mounted thereon;
    lower and an upper wheel suspension links coupled to said wheel carrier, said lower link comprising an arm which is pivotally connected to the wheel carrier at a lateral distance from a longitudinal center plane of said wheel;
    an upper guiding joint having a bearing housing fixed to a vehicle body of said vehicle, said upper guiding joint having a pivot point situated on a longitudinal axis of said bearing housing;
    an upright shock absorber borne by said upper link, and having a piston rod which is elastically held in said upper guiding joint and;
    wherein, in an installed position of said shock absorber, a longitudinal axis of said piston rod is rotated about said pivot point out of an equilibrium position of said piston rod, in which equilibrium position said longitudinal axis of said piston rod is inclined relative to said longitudinal axis of said bearing housing, into substantial alignment with said longitudinal axis of said bearing housing, whereby the upper guiding joint is prestressed to provide a bias in a transverse direction of the vehicle about said pivot point, generating a torque counteracting a bending moment applied to the shock absorber by way of the wheel carrier.

2. A wheel suspension according to claim 1, wherein the upper guding joint has at least one prestreassable rubber body inserted between two bearing parts.

3. A wheel suspension according to claim 2, wherein the rubber body is vulcanized between inner and outer bearing parts.

4. A wheel suspension according to claim 3, the rubber body is a rubber metal element.

5. A wheel suspension according to claim 4, wherein the rubber body is a ring disk.

6. A wheel suspension according to claim 4, wherein the upper guiding joint is a ball joint, and a partially spherical rubber body is vulcanized between an inner spherical bearing part of said ball joint, carried by the piston rod, and an outer bearing part constructed in the form of a ball socket.

7. A wheel suspension according to claim 6, wherein the rubber body and the outer bearing part are constructed in a shape of a spherical segment.

8. A wheel suspension according to claim 7 wherein the inner spherical bearing part has a recess which receives an end of said piston rod and into which, during compressions, an upper end of the shock absorber penetrates.

9. A wheel suspension according to claim 6, wherein the inner spherical bearing part has a recess which receives an end of said piston rod and into which, during compriessions, an upper end of the shock absorber penetrates.

10. A wheel suspension according to claim 9, wherein the inner spherical bearing part is penetrated by a threaded shaft provided on a front end of the piston rod, a threaded nut being screwed onto the ghreaded shaft, which braces the spherical inner bearing part and the piston rod with one another.

11. A wheel suspension according to claim 3, wherein the rubber body is a ring disk.

12. A wheel suspension according to claim 3, wherein the upper guiding joint is a ball joint, and a partially spherical rubber body is vulcanized between an inner spherical bearing part of said ball joint, carried by the piston rod, and an outer bearing part constructed in the form of a ball socket.

13. A wheel suspension according to claim 12, wherein the rubber body and the outer bearing part are constructed in a shape of a spherical segment.

14. A wheel suspension according to claim 13, wherein the inner spherical bearing part has a recess which receives an end of said piston rod and into which, during compressions, an upper end of the shock absorber penetrates.

15. A wheel suspension according to claim 14, wherein the inner spherical bearing part is penetrated by a threaded shaft provided on a front end of the piston rod, a threaded nut being screwed onto the threaded shaft, which braces the spherical inner bearing part and the piston rod with one another.

16. A wheel suspension according to Claim 12, wherein the inner spherical bearing part has a recess which receives an end of said piston rod and into which, during compressions, an upper end of the shock absorber penetrates.

17. A wheel suspension according to claim 16, wherein the inner spherical bearing part is penetrated by a threaded shaft provided on a front end of the piston rod, a threaded nut being screwed onto the threaded shaft, which braces the spherical inner bearing part and the piston rod with one another.

18. A wheel suspension according to claim 17, wherein the shock absorber is non-rotatably head on the wheel carrier with a lower end of a cylindrical pipe thereof, and is laterally supported along a part of its length in the transverse direction of the vehicle by means of a supporting element extending from the wheel carrier in an upward direction.

19. A wheel suspension according to claim 16, wherein the shock absorber is non-rotatably held on the wheel carrier with a lower end of a cylindrical pipe thereof, and is laterally supported along a part of its length in the transverse direction of the vehicle by means of a supporting element extending from the wheel carrier in an upward direction.

20. A wheel suspension according to claim 1, wherein the shock absorber is non-rotatably held on the wheel carrier with a lower end of a cylindrical pipe thereof, and is laterally supported along a part of its length in the transverse direction of the vehicle by means of a supporting element extending from the wheel carrier in an upward direction.

* * * * *